United States Patent [19]

Anderson et al.

[11] Patent Number: 4,773,719

[45] Date of Patent: Sep. 27, 1988

[54] OPTICAL NOVELTY FILTER

[76] Inventors: Dana Z. Anderson, 1325 D Bear Mountain Dr., Boulder, Colo. 80303; Jack L. Feinberg, 725 33rd St., Manhattan Beach, Calif. 90266

[21] Appl. No.: 79,800

[22] Filed: Jul. 30, 1987

[51] Int. Cl.⁴ .................. G03H 1/02; G02B 27/00
[52] U.S. Cl. ................................ 350/3.64; 350/370
[58] Field of Search ........................ 350/3.64, 370

[56] References Cited

U.S. PATENT DOCUMENTS 4,674,824  6/1987  Goodman et al. .............. 350/3.64
4,718,749  1/1988  Chiou et al. ..................... 350/163

Primary Examiner—Bruce Y. Arnold
Attorney, Agent, or Firm—Anderson & Giaccherini

[57] ABSTRACT

Changes in an image are detectable by a tracking novelty filter while an incorporated holographic medium is in disequilibrium. A suitably doped single-domain barium titanate crystal can serve as the holographic medium. Image information is imposed on a laser beam in the form of a spatially varying polarization across the beam cross section spatial position. The modulated beam is directed to the crystal, which cooperates with a polarizing beam splitter and a half wave plate to define a polarization conjugator. The conjugated beam is passed through the modulator a second time and then operated on by a beam splitter. When the crystal is in equilibrium with the incident laser light, the beam splitter directs minimal light to a detector. However, when an image change causes a change in the applied modulation, the changed image elements are intensified at the detector while the holographic medium is in disequilibrium. In alternative embodiments, phase is the variable modulated. The holographic medium can be arranged as a conjugator or a two-wave or four-wave mixer.

15 Claims, 3 Drawing Sheets

OPTICAL NOVELTY FILTER

BACKGROUND OF THE INVENTION

The present invention relates to optical systems, and, more particularly, to an optical novelty filter.

A novelty filter recognizes what is new or different in one pattern compared with a set of one or more reference patterns. A "tracking" novelty filter continually updates a reference pattern in time. Thus, the device extracts changes which occur in a pattern from one time frame to the next.

Tracking novelty filters have been employed at least since the early days of radar when they were used to keep radar screens from becoming cluttered by non-moving objects. This kind of filter is easily implemented with a digital computer by subtracting incoming images, pixel-by-pixel, from a stored reference image and periodically updating the reference image.

A disadvantage of the digital subtraction approach is that updates are limited by processing and accessing rates. As a corollary, imaging speed decreases in proportion to the number of pixels. Thus, scaling to high resolution images reduces the processing In addition, a digital system requires a great many components resulting in considerable bulk and expense. Furthermore, the large number of components increases the number of possible error sources, thus decreasing reliability. Despite advances in electronic technology providing for greater integration of components and reduction of size, the number of components required for some applications remains problematic.

What is needed is an alternative novelty filter which can be scaled readily to any resolution and is not significantly limited by processing speed. Futhermore, such a novelty filter should comprise relatively few components for decreased cost and improved reliability.

SUMMARY OF THE INVENTION

A novelty filter comprises a laser source, a modulator, a controller for altering the modulation function of the modulator, a holographic medium, a parameter converter and, generally, a detector. These components are arranged so that the contrast of the novelty filter output increases upon a change of the modulation function. The modulation function can be controlled according to an image input to the controller.

The laser source generates at least one laser beam. In some embodiments multiple laser beams are used. The multiple-beams can be obtained by splitting an original laser beam or by using phase-coupled lasers as the laser source.

The modulator modulates some parameter of a laser beam according to a modulation transfer function. The parameter can be polarization, phase, frequency, amplitude, or any other parameter characteristic of a laser beam. The modulator includes an input for determining the modulation function at any given time.

The modulator input can be raster data for controlling individual inputs. Alternatively, the modulator can be switched directly by an image pattern from an incoherent light source or from a second laser beam.

The modulation controller is designed to provide the appropriate type of signal to control the modulation function of the modulator, generally in response to an image being viewed. For example, the modulation controller can be a video camera with a raster output for a raster controlled modulator.

The holographic medium provides for the formation and reformation of a hologram in response to an incident laser beam pattern. Such a holographic medium is distinguishable from photographic film-type holographic media in that the hologram is continuously reformable and in that the hologram can be read as it is being formed. In computer memory terminology, the holographic medium is a concurrent read-write memory.

When the hologram formed in the holographic medium reaches a steady-state relationship with a constant incident laser beam pattern, the holographic medium is said to be in equilibrium. Once in equilibrium, the hologram remains unchanged until the incident laser beam pattern changes.

An abrupt change in the incident laser beam pattern can induce a disequilibrium in the holographic medium. The disequilibrium induces the hologram to reform until equilibrium is re-established. Significantly, the equilibrium is not re-established instantaneously. When the change in the incident laser beam pattern is sufficient, the disequilibrium condition is detectable.

A novelty filter can be configured so that each laser beam incident a holographic medium is transmitted, or alternatively, so that each is reflected. In a reflective configuration, the medium functions as a conjugator with respect to the parameter of interest while the medium is in equilibrium. For example, the holographic medium can function as a phase conjugator or a polarization conjugator. In a transmissive configuration, the medium functions as an optical mixer.

A preferred holographic medium is a photorefractive crystal such as single-domain barium titanate crystal. Such a material meets the above requirements and furthermore can permit self-pumping. Generally, separate laser beams are required to read and write a hologram. However, self-pumping permits the image-bearing beam to serve as the energy source for both reading and writing the hologram.

A single-domain crystal of barium titanate usually requires extraordinarily polarized light for self-pumping. Extraordinarily polarized light can be phase conjugated or optically mixed effectively by such a crystal. However, a holographic means can employ an optical adaptor to implement a polarization conjugator to complement a polarization modulator.

The parameter converter provides an intensity distribution for detection purposes. The nature of the parameter converter depends both on the parameter of interest and the configuration of the components relative to the holographic medium. For example, in a reflective/-polarization embodiment in which polarization is the parameter of interest and the holographic medium is configured with an adaptor as a polarization conjugator, the parameter converter can be a polarizing beam splitter. In such a configuration, the photons to be detected successively reach the following elements in a laser beam path: the laser location, the polarizing beam splitter, the modulator, the adaptor, the holographic medium, the adaptor, the modulator, the polarizing beam splitter and the detector.

Note that in this embodiment, the beam path traverses several elements, e.g., the polarizing beam splitter and the modulator, more than once. This can cause ambiguities in identifying locations along the path. For this reason, the path can be characterized by a series of unique space-time locations ordered chronologically according to the initial generation of a photon at the laser source and the final arrival at the detector. Using this scheme, the modulator is situated at two distinct space-time locations which are physically coincident but separated in time. The first of these space-time locations is located "before" the space-time location of the holographic medium, and the other modulator space-time location is located "after" the space-time location of the holographic medium.

Using this terminology in the context of a reflective/phase embodiment of the present invention, a detection path includes source, beam-splitting modulation, phase-conjugating, demodulating, conversion and detection space-time locations. The modulating space-time location and the demodulating space-time location are physically coincident with a phase modulator. The beam-splitting location and the conversion location are physically coincident with a beam-splitting mirror.

In the reflective/phase embodiment, the beam-splitting mirror produces a second laser beam which is phase conjugated by the holographic medium. Since a phase conjugated beam retraces its path as though time-reversed, this second laser beam returns to the beam splitter. Thus, the second beam path includes the beam-splitting space-time location, the phase-conjugating space-time location and the conversion space-time location of the detection path. However, the second laser beam does not include the modulation and demodulation space-time locations.

When the holographic medium is in equilibrium, both laser beams are phase-conjugated. Upon return to the modulator, the first beam is demodulated. In effect, the first beam returns to the beam splitter in the form it would have had there been no modulator in its path. In the absence of the second laser beam, the beam splitter would split the returning first laser beam between a direction toward the laser source and a direction toward the detector. However, using the principle of time-reversal, it can be determined that the second beam interferes with the first in such a way as to interfere constructively in the direction of the laser source and to interfere destructively in the direction of the detector so that negligible light is directed to the detector.

When the controller imposes an abrupt change in the modulation function, the equilibrium of the holographic medium with respect to the first laser beam is interrupted. The first laser beam is not correctly conjugated while the holographic medium is in disequilibrium. Therefore, interference at the beam splitter is not complete, and the detector detects an intensity distribution representing the changed image elements represented in the modulation function.

In a transmissive/phase embodiment of the present invention, a holographic medium functions as an optical mixer. Accordingly, two laser beam segments interfering at the holographic medium can couple the optical energy from one of the segments to the other segment. A detector is positioned to detect the intensity pattern output from the holographic medium along one of the segments. When the medium is in equilibrium almost all the energy input along said first segment is coupled to the beam in the second segment. However a modulator located along said first segment can abruptly phase modulate the beam along the first segment. During the ensuing disequilibrium, the detector detects an intensity distribution corresponding to the changes in the modulation function.

In this transmissive embodiment, the two beam segments can be defined from a single laser beam. A detection path includes the following succession of space-time locations: source, first holographic medium, modulator, second holographic medium and the detector space-time locations. The holographic medium serves double duty as a holographic means and a conversion means in that the interference at the holographic medium converts the difference between the current phase distribution of the second laser beam segment and the phase distribution represented by the hologram into an intensity distribution for detection purposes.

In any of the foregoing embodiments, the duration of the detected intensity can be determined by controlling the time response of the holographic medium such as by selection of the holographic material, altering the incident optical intensity, or altering the strength of a voltage applied to the holographic material. The resolution of the system is effectively governed by the resolution of the modulator. Thus, the resolution of a system can be increased simply by changing the modulator and using an appropriate modulation controller.

Changes in the intensity distribution at the detector are essentially instantaneous with changes in the modulation function. Therefore, any limitations on the detection of an image change are due to the speed at which an image change can be imposed on the light beam by the modulator function and by the responsiveness of the detector. The time delay in converting an image change to a change in the modulation function can be very short, for example, where the modulator is optically switched.

In many applications, it is not desirable to completely suppress the constant elements of a scene. The unchanging elements of a scene can provide a frame of reference for the changes. Accordingly, limited contrast and variable contrast novelty filters are also provided. The limited contrast and variable contrast features can be implemented in several ways, as disclosed and suggested below.

The present invention provides for a very fast, real-time, parallel processing optical tracking novelty filter. The speed limitations and inherent serial nature of electronic novelty filters are largely overcome. Furthermore, the present invention provides for convenient scaling to higher resolutions. These and other features and advantages of the present invention are apparent in the description below with reference to the follow drawings.

DESCRIPTION OF THE PREFERRED EMBODIMENTS

Figure 1:
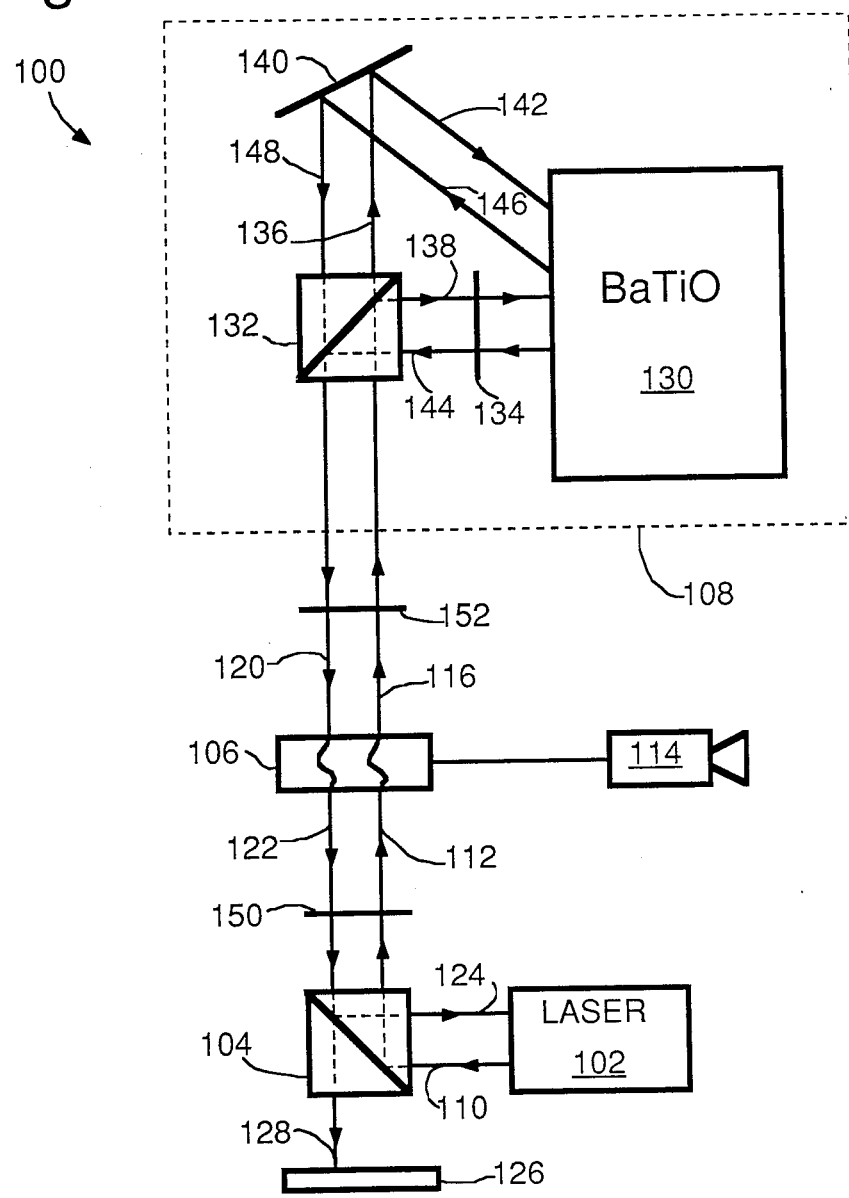
FIG. 1 is a schematic illustration of a reflective novelty filter in accordance with the present invention in which the polarization of a laser beam is modulated as a function of spatial position.

A reflective/polarization novelty filter 100 includes a laser source 102, a polarizing beam splitter 104, a polarization modulator 106, and a polarization conjugator 108, as shown in FIG. 1. The laser source 102 generates a laser beam along a path including path vector 110 and the polarizing beam splitter 104. The polarizing beam splitter 104 selects a predetermined polarization of the laser beam component 112 directed along path vector 112 to the polarization modulator 106; any laser energy transmitted through the polarizing beam splitter 104 from along vector 110 is discarded.

The polarization modulator 106 is shown controlled by a video camera 114. The video camera 114 converts an intensity function of spatial distribution into an electrical signal that is sent to the modulator 106. A polarization function of spatial position, determined by the electrical signal, is imposed on the beam arriving along vector 112 by the modulator 106. Thus the beam along a path vector 116 between the modulator 106 and the polarization conjugator 108 is characterized by the modulation function imposed by the modulator 106.

The polarization conjugator 108 generates a laser beam along a path vector 120, coincident and opposed to path vector 116. (The spacing in FIG. 1 between pairs of path vectors, such as vectors 116 and 120 is for illustrative purposes only.) When the polarization conjugator 108 is in steady state, the beam along vector 120 is the polarization conjugate of beam along vector 116. In other words, the conjugated beam is directed along path vectors 120, 122 and 124, thus retracing the path, including vectors 110, 112 and 116, of the original beam incident to the conjugator 108. In this steady state condition, the effect of the polarization conjugator 108 is to impose a polarization function on the reflected beam which is exactly cancelled by the function imposed by the modulator. Thus the beam along vector 122 has the same polarization as the opposing beam directed along vector 112, i.e., the polarization imposed by the polarizing beam splitter 104.

A detector 126, positioned to detect laser energy directed along a path vector 128, detects negligible light in steady state when conjugation is complete. However, just after an abrupt change in the image viewed by the camera 114, and thus in the modulation function applied by the modulator 106, there is a temporary disequilibrium between the crystal 130 and the incident beam along vector 116. During this disequilibrium, the polarization of the incident beam along vector 116 is incompletely conjugated so that the polarization of the original component beam 112 is not completely restored at vector 122. The discrepancy in polarization causes some of the reflected beam to be transmitted through the polarizing beam splitter 104 and along a path vector 128 so as to be detected at the detector 126.

In the illustrated novelty filter 100, the detector 126 includes a screen, although a photodetector could be used where further processing of the image is to be performed. The detector 126 also includes a lens to focus the beam along vector 128 at the screen.

The polarization conjugator 108 includes a barium titanate crystal 130, which serves as a holographic medium. An advantage of barium titanate is that it can be self-pumped so that separate pumping beams are not required. Since self-pumping requires extraordinary polarization, a second polarizing beam splitter 132 and a half-wave plate 134 are included so that all laser energy incident to the barium titanate crystal 130 has extraordinary polarization.

More specifically, the polarizing beam splitter 132 splits the incident beam along path vector 116 into a transmitted component, directed along a vector 136, having extraordinary polarization and a reflected component, directed along a path vector 138, having orthogonal polarization. The transmitted component is reflected by a conventional mirror 140 and arrives at the barium titanate crystal 130 along a path vector 142. The polarization of the reflected component along vector 138 is rotated to the favored polarization by the half-wave plate 134 so that it has extraordinary polarization as it arrives at the barium titanate crystal 130. Thus, both the transmitted and reflected light components reach the barium titanate crystal 130 with extraordinary polarization. In effect polarizing beamsplitter 132, half-wave plate 134 and mirror 140 serve selectively as an adapter which, along with holographic medium 130, comprise polarization conjugator 108.

The beams incident on the crystal 130 along vectors 138 and 142 are respectively phase-conjugated during equilibrium. The half-wave plate 134 alters the polarization of the phase conjugated beam 144 so as to match the polarization of the incident beam vector 138. The phase conjugate of the transmitted beam along vectors 136 and 142 returns to the polarizing beam splitter 132 via path vectors 146 and 148. Again, during equilibrium, the polarizations of the returning transmitted and reflected components 148 and 144 are such that they interact constructively along the same path as they arrived. The summed return signal along vector 120 is the polarization conjugate version of the beam incident on the polarization conjugator 108 along vector 116.

A quarter wave plate 150 is interposed between the first polarizing beam splitter 104 and the polarization modulator 106 to provide an adjustment to minimize the intensity modulation present in each of the two component beams along vectors 136 and 138 defined by the polarizing beam splitter 132 of the conjugator 108. A half-wave plate 152 between the modulator 106 and the conjugator 108 provides an adjustment to equalize the light intensity of the same two beams along the vectors 136 and 138.

The laser source 102 can include lasers of many different types, for example gas lasers and diode lasers. In addition, the laser source 102 can include a converging lens, a pin-hole type spatial filter and a collimating lens to condition the laser beam prior to incidence at the polarizing beam splitter 104.

The polarization modulator 106 can be any one of a number of such devices. An inexpensive polarization modulator 106 can be fabricated from a reflective-type liquid crystal television (LCTV) screen as follows. In the present case, a Seiko LCTV, model LVD 012, was used. The reflective material and one or both of the built-in polarizers are removed and some rewiring is done to make the screen a transmitting one. Alternatively, a transmissive LCTV can be used as a starting point.

The crystal 130 serving as a holographic medium is a single-domain crystal of barium titanate with sufficient charge carriers to be photo-refractive. In the novelty filter 100, the density of charge carriers is about $10^{16}$ carriers per cubic centimeter. Preferably, the crystal 130 is a rectangular parallelpiped, measuring between 2 mm and 7 mm per side.

Figure 2:
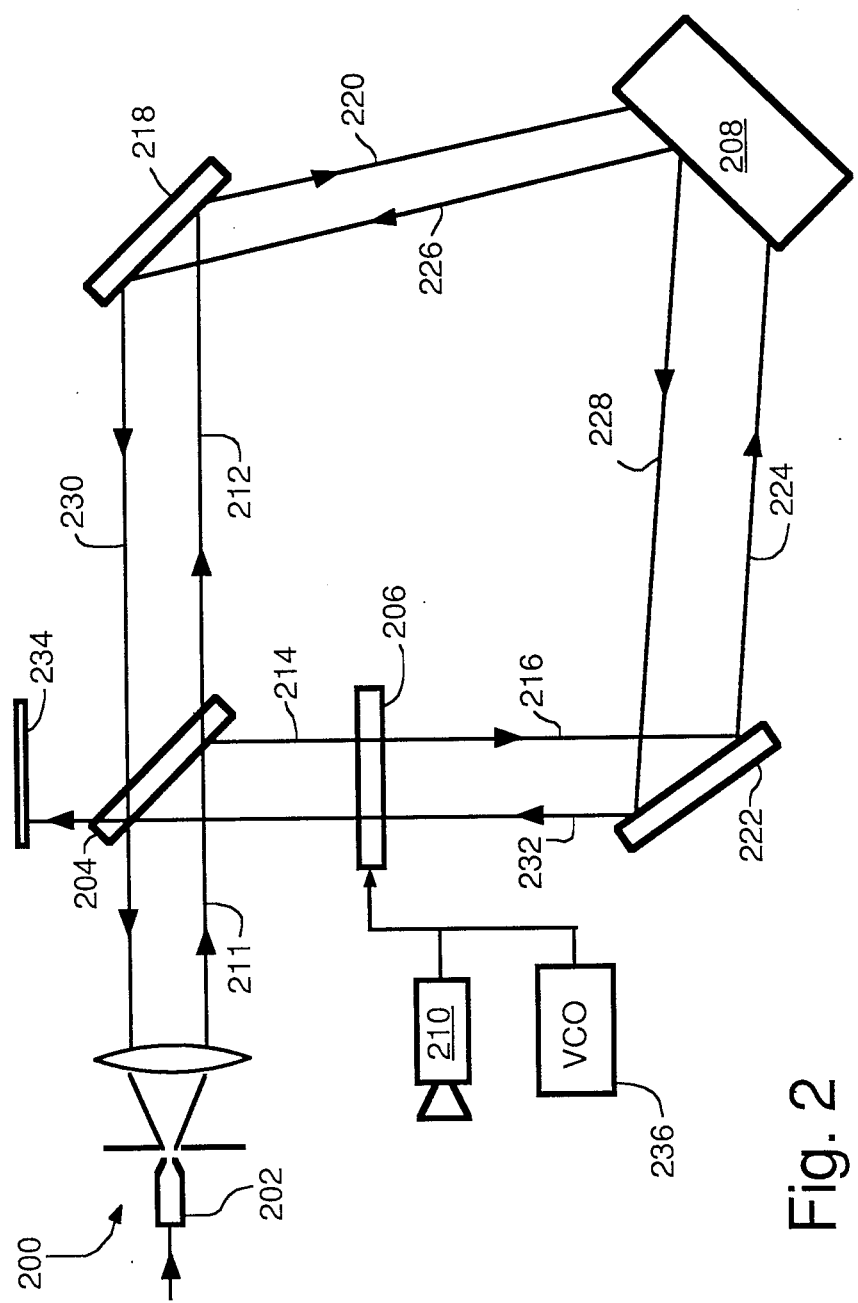
FIG. 2 is a schematic illustration of a reflective novelty filter in accordance with the present invention in which the phase of a laser beam is modulated as a function of spatial position.

A phase/spatial reflection-type novelty filter 200, shown in FIG. 2, includes a laser source 202, a beam-splitter 204, a phase modulator 206 and a barium titanate crystal 208. A pumping beam is provided for the crystal 208 so that it serves as a phase conjugator, or it can be used in a self-pumped configuration. The phase modulator 206, which can be a liquid crystal matrix, such as the display of an LCTV without reflector or polarizing elements, is driven by a camera 210 viewing an image.

The laser source 202 generates a laser beam along a path vector 211. The beam splitter 204, which can be a half-silvered mirror, divides this original laser beam into a transmitted component beam directed along a path vector 212 and a reflected component beam directed along a vector path 214. The reflected component beam along vector 214 is phase modulated by the phase modulator 206 yielding a modulated beam along a path vector 216. A first conventional mirror 218 reflects the beam along vector 212 toward the crystal 208 along a path vector 220. Likewise, a second conventional mirror 222 reflects the modulated beam along vector 216 toward the crystal 208 along a path vector 224.

The crystal 208 phase conjugates the beams of vectors 220 and 224 to respectively opposing vectors 226 and 228. The conventional mirrors 218 and 222 respectively direct these reflected beams along path vectors 230 and 232 so that they interfere at beam splitter 204. During steady state, the interference is such that the beams returning along vectors 230 and 232 add constructively in the direction of the laser source 202 and negligible light is detected at a detector 234. However, in the event of a sufficiently rapid change in the scene viewed by the camera 210, destructive interference toward the detector 234 is incomplete so that the change is detected.

The output of a frequency generator 236, a voltage controlled oscillator (VCO), is added to the camera output. The intensity and frequency of the frequency generator 236 output can be adjusted thereby affecting the degree to which equilibrium is reached by the phase conjugator 208. Accordingly, the entire scene viewed by the camera 210 is continually, though weakly, detected at the detector 234. However, when a change in the scene occurs, the changed portion of the image is represented with greater intensity at the detector 234.

Thus, the changes are viewed against a relatively faint context. The degree of contrast between the background and the changes can be adjusted by controlling the frequency and intensity of the frequency generator output.

Figure 3:
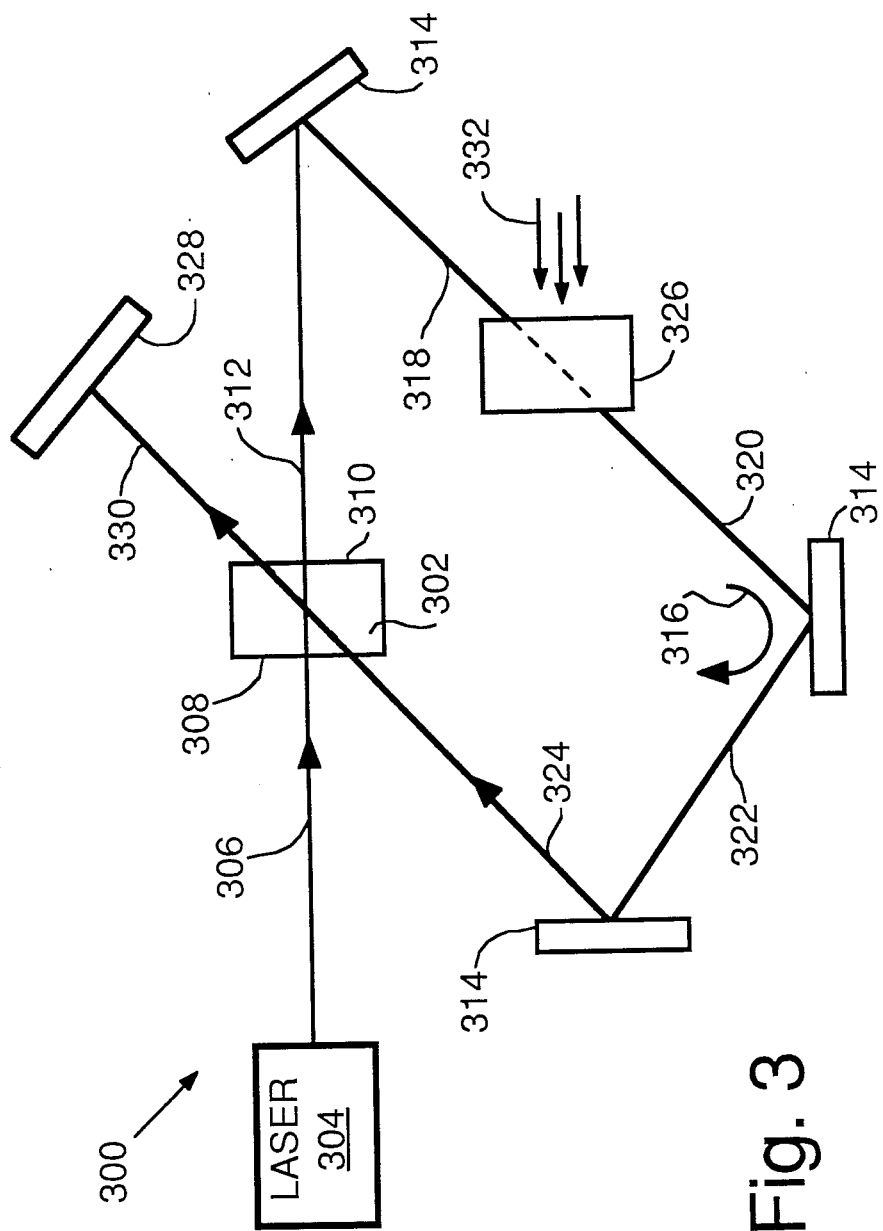
FIG. 3 is a schematic illustration of a transmissive novelty filter in accordance with the present invention in which the phase of a laser beam is modulated as a function of spatial position.

In a transmissive novelty filter 300, shown in FIG. 3, a laser beam is made to transmit through a barium titanate crystal 302 twice so as to interfere with itself. In this embodiment the holographic medium serves as an optical mixer rather than as a conjugator. A laser source 304 generates the laser beam and directs it along a path vector 306. The beam then passes through the crystal 302 from a front face 308 to a rear face 310, exiting along a path vector 312. A series of mirrors 314 define a return loop 316 for the laser beam including path vectors 312, 318, 320, 322 and 324 so that it is again incident the front face 308 of the crystal, but directed obliquely with respect to the original beam along vector 306.

A phase modulator 326 is positioned within the return loop 316 so that the beam along vectors 320, 322 and 324 has image information encoded thereon. A detector 328 is placed at the end of a path vector 330, which shares the trajectory of path vector 324 to the crystal 302, to detect any component transmitted directly through the crystal 302.

In steady-state, the laser beam along vector 306 interferes with the beam along vector 324 so that negligible light is detected. However, when the phase modulator 326 changes, there is an image detected at detector 328 until the crystal 302 re-establishes equilibrium.

Thus, this transmissive optical novelty filter 300 is characterized by a phase function of spatial distribution. Since the crystal 302 serves to split the laser energy arriving along vector 324 between vectors 312 and 330, the crystal 330 serves as a beam-splitter and conversion means.

The phase modulator 326 comprises photosensitive material and can be switched optically by an image projected thereon as indicated by arrows 332. In other words, the incident image along arrows 332 determines the state of the phase modulator 326, which, in turn, determines the modulation imposed on the laser beam passing through. With this approach, one is moved another step from the constraints of serial and electronic processing.

In another configuration, the source of the beam through the modulator need not be a looped beam, but can be another appropriate beam. For example, the two beams can be generated from a single laser source using a beam splitter, as was done in the phase version of the reflective novelty filter, i.e. novelty filter 200.

In an alternative configuration of the transmissive novelty filter, the modulator is placed along the original beam rather than on the beam after transmission through the crystal. Again, an image is detected after an image change and before holographic equilibrium is re-established.

In the forgoing embodiments the holographic medium is barium titanate. However, other holographic media can be used. The criteria are that the medium admits of being read while being written to, and that the writing process cannot be instantaneous. In particular, the write time must be long enough for the detector employed to register the light impinging upon it during disequilibrium. This time can vary according to the detector selected. Also, the time it takes a crystal to re-equilibrate is a function of the degree of disequilibrium induced. Thus, a novelty filter might only detect changes over a minimum threshold.

It should be noted that, with respect to each of the foregoing embodiments, a projection operator or "boring filter" can be constructed by placing a detector and another beam splitter between the laser source and the beam splitter. A detector so placed detects all unchanging scene elements. Alternatively, in a phase-modulating embodiment, interference at beam-splitting mirror can be made constructive rather than destructive.

Whereas, the present invention has been illustrated in the context of modulators which modulate either phase or polarization as a function of spatial cross sectional position, the present invention admits of a broad range of independent and dependent variables. For example, the parameter being modulated can be any parameter which can be used to characterize laser light. Thus, amplitude and frequency can be the parameter modulated.

In addition, the modulation need not be with respect to spatial position. For example, the phase can be modulated as a function of frequency. The selection of the modulation function determines the type of holographic medium to be used, the type of beam splitter used, and the type of detector used. The detector must be able to detect the value of the dependent variable as a function of the independent variable, the beam splitter must be able to split according to the same function, and the holographic medium must respond accordingly. For example, in a reflective embodiment, the medium must conjugate the first variable as a function of the independent variable.

In many applications, it is not desirable to completely cancel the steady-state image. Instead, it is often desired to maintain a background image as a context for locating the changes identified by the novelty filter. Preferably, the contrast between the background and foreground can be varied. A variable contrast function is provided by the frequency generator 236 of novelty filter 200 in FIG. 2. Alternatively, a registration or other background function can be implemented in a number of other ways.

For example, one straightforward manner of showing change in context is to superimpose the overall image on the detector arranged to detect the novelty component from the novelty filter. In fact, a context can be drawn right on the screen. Variable contrast can be effected by varying the strength of a background scene projection or by varying the strength of the novelty image.

Another approach is to include a non-reciprocal element in the beam path of the novelty filter. For example, in a phase-reflective novelty filter similar to the one in FIG. 2, a variable attenuator is interposed in one of the component beam paths so that cancellation at the beam splitting mirror is not perfect even in steady state.

The present invention provides for a laser beam to be transmitted through a variety of media, including, air, space and optical fibers. Furthermore, the laser can be operated in continuous mode or in pulsed mode. In the latter case, the pulsing can be spaced, for example, twenty-four hours apart, where the crystal memory is sufficient. Thus, a very low pulse rate mode can be used for the investigation of slowly changing events, such as plant growth. Using a fast pulse rate, stroboscopic applications are provided for.

In the illustrated embodiments, beam splitting mirrors and a polarizing beam splitter are used to convert to an intensity versus beam cross-section position distribution for detection. However, alternative filtering means can be used to obtain the desired conversion to an intensity distribution.

In addition to these major variants, many differing arrangements of mirrors, lenses, and imaging systems, as well as variable contrast provisions, can be used. Further modifications and variations are provided for by the present invention, the scope of which is limited only by the following claims.

What is claimed is:
1. A novelty filter comprising:
   laser means for generating at least one laser beam;
   modulator means for modulating a parameter of a laser as a function of beam cross-sectional position;
   holographic means including a holographic medium for forming and reforming a hologram in response to an incident laser beam pattern, said holographic medium having alternative equilibrium and disequilibrium conditions; and
   conversion means for converting a distribution of said parameter into an intensity distribution.

2. The novelty filter of claim 1 further comprising detector means for detecting said intensity distribution.

3. The novelty filter of claim 2 wherein said modulator means has an input for a control signal for varying said function over time.

4. The novelty filter of claim 3 further comprising image means for controlling said function over time, said laser means, said modulator means, said holographic means, said conversion means and said detector means being optically coupled so that the contrast of said intensity distribution increases when said image means changes so as to induce a disequilibrium in said holographic medium and so that the contrast of said intensity distribution decreases while equilibrium is being re-established in said holographic medium while said modulation function is held substantially constant.

5. The novelty filter of claim 3 wherein said holographic means is configured relative to said laser means so that said holographic means and said conversion means function as a conjugator with respect to said parameter when said holographic medium is in equilibrium.

6. The novelty filter of claim 3 wherein said holographic means is configured relative to said laser means so that said holographic means and said conversion means function as an optical mixer when said holographic medium is in equilibrium.

7. A novelty filter comprising:
   laser means including a laser source for generating at least a first laser beam and path means for defining at least a first laser beam path for said first laser beam, said first laser beam path including a series of space-time locations arranged according to the order in which a photon generated by said laser source would traverse the respective space-time locations, said space-time locations including a laser source space-time location at which said first laser beam is generated and an output space-time location, said laser beam path extending from said laser source to at least said output space-time location, said laser beam having a distribution function of a parameter over beam cross-sectional position, path space-time location and time;
   modulator means for modulating said first laser beam according to a modulation transfer function of said parameter over beam cross-sectional position, said modulator means being arranged to apply said modulation transfer function at a first modulation space-time location along said path after said source space-time location and before said output space-time location, said modulation means including input means for controlling said modulation transfer function over time;
   holographic means for responding to said laser beam by forming and reforming a hologram for modulating said first laser beam according to a hologram-dependent function of beam cross-sectional position, said holographic means including a holographic medium for said hologram, said medium being arranged at a first holographic space-time location along said first path positioned after said first modulator space-time location and before said output space-time location, said medium having alternative equilibrium and disequilibrium conditions, said equilibrium conditions occurring when the hologram formed within said medium corresponds to an incident laser beam pattern in such a way that the hologram remains unchanged as long as the incident laser beam pattern remains unchanged, said disequilibrium condition occurring when a hologram formed within said medium does not correspond to the incident laser beam pattern in such a way;

conversion means for converting a distribution of said parameter into an intensity distribution of said first laser beam, said conversion means being arranged to convert said first laser beam at a conversion space-time location along said first path between said holographic space-time location and said output space-time location so that said laser beam has an intensity distribution as a function of cross-sectional position and so that there is a well-defined mapping of cross-sectional positions of said intensity distribution with cross-sectional positions of said modulation transfer function; and a controller for controlling said modulation transfer function as a function of time so that a change in the value of the intensity at a cross-sectional position of said first laser beam at a space-time location beyond said filtering location indicates a disequilibrium condition of said holographic means in conjunction with a change in the value of said modulation transfer function at the corresponding cross-sectional position of said laser beam at said first modulation space-time location, and so that said intensity distribution is constant while both the holographic means is in an equilibrium condition and said modulation transfer function is constant.

8. The novelty filter of claim 7 wherein:
said modulator means modulates polarization;
said holographic means, during equilibrium, polarization conjugates said first laser beam so that said modulator means modulates said laser beam a second time at a second modulation space-time location chronologically distinct from and physically coincident with said first modulation space-time location; and
said conversion means includes a polarization beam splitter arranged to divert a component of said first laser beam having a predetermined polarization from said output space-time location, said beam splitter being arranged to divert said component at a diversion location along said first path between said second modulation space-time location and said output space-time location, said beam splitter also being arranged to impose said predetermined polarization on said first laser beam at a polarization space-time location along said first path, said polarization space-time location being chronologically distinct from and physically coincident with said diversion location.

9. The novelty filter of claim 7 wherein said holographic medium is a doped single-domain barium titanate crystal, said holographic means including an adaptor for coordinating with said crystal to constitute a polarization conjugator.

10. The novelty filter of claim 9 wherein said first laser beam path includes said second path segment which is located after said source location and before said first path segment.

11. The novelty filter of claim 7 wherein:
said modulator means modulates phase;
said holographic means, during equilibrium, polarization conjugates said first laser beam so that said modulator means modulates said laser beam a second time at a second modulation space-time location chronologically distinct from and physically coincident with said first modulation space-time location; and said filtering means includes a beam-splitting mirror arranged to affect said laser beam at a splitting space-time location along said first path and at a diversion space-time location along said first path, said splitting space-time location and said diversion space-time location being chronologically distinct and physically coincident, said path means defining a second path for said second laser beam respectively including said splitting space-time location, said holographic space-time location, and said diversion space-time location so that said first laser beam and said second laser beam interfere at said diversion space-time location.

12. The novelty filter of claim 7 wherein:
said modulator means modulates phase;
said path means includes means for defining first and second laser beam path segments which intersect at said holographic medium, said laser means and said filtering means cooperate for providing a first laser beam segment along said first path segment and a second laser beam segment along said second path segment so that said first and second laser beam segments can interfere at said holographic medium, said first path including said first path segment, said first path segment including said first modulation space-time location.

13. A novelty filter comprising:
a laser source for generating a laser beam;
a polarizing beam splitter for providing a polarized laser beam by imposing a predetermined polarization on said laser beam;
a polarization modulator for providing a modulated laser beam by modulating said polarization of said polarized laser beam as a function of beam cross-sectional position, said modulator having an input for receiving control signal for controlling said modulation transfer function;
holographic means for responding to said modulated laser beam by forming and reforming a hologram which in turn modulates the polarization of said modulated laser beam according to a hologram-dependent polarization function of beam cross-sectional position, said holographic means including a holographic medium for said hologram, said medium having alternative equilibrium and disequilibrium conditions, said equilibrium conditions occurring when the hologram formed within said medium corresponds to said laser beam pattern in such a way that said hologram remains unchanged as long as the polarization distribution of said laser beam at said holographic medium remains unchanged, said disequilibrium condition occurring when said hologram does not correspond to said laser beam in such a way, said holographic means serving to polarization conjugate said modulated laser beam when said holographic medium is in equilibrium;
a detector arranged to detect the intensity distribution of the component of said laser beam diverted away from said laser source;
a modulation controller for controlling said modulation transfer function as a function of time so that when said holographic means is in equilibrium substantially all of said laser beam returning to said polarization beam splitter is directed toward said laser source and so that when said holographic means is in disequilibrium a significant component of said laser beam is detected by said detector.

14. A novelty filter comprising:
a laser source for generating a first laser beam;
a beam-splitting mirror for providing second and third laser beams by dividing said first laser beam;
a phase modulator for providing a modulated second laser beam by modulating said second laser beam, said modulator having an input for receiving control signal for controlling said modulation transfer function;
holographic means for responding to said modulated second laser beam and said third laser beam by forming and reforming a hologram which in turn modulates the phase of said third and modulated second laser beam according to a hologram-dependent phase function of beam cross-sectional position, said holographic means including a holographic medium for said hologram, said medium having alternative equilibrium and disequilibrium conditions, said equilibrium conditions occurring when the hologram formed within said medium corresponds to said third laser beam and said modulated second laser beam in such a way that said hologram remains unchanged as long as the phase distributions of said third laser beam and said modulated second laser beam at said holographic medium remain unchanged, said disequilibrium condition occurring when said hologram does not correspond to said third laser beam and said modulated second laser beam in such a way, said holographic means serving to phase conjugate said third laser beam and said modulated second laser beam when said holographic medium is in equilibrium;
a detector arranged to detect the intensity distribution of the component of said laser beam diverted away from said laser source;
a modulation controller for controlling said modulation transfer function as a function of time so that when said holographic means is in equilibrium substantially all of said laser beam returning to said polarization beam splitter is directed toward said laser source and so that when said holographic means is in disequilibrium a significant component of said laser beam is detected by said detector.

15. A novelty filter comprising:
laser means for generating first and second intersecting laser beam segments;
a holographic means including a holographic medium located at the intersection of said laser beam segments for responding to the phase distribution of said laser beam segments by forming and reforming a hologram for determining the mutual interference effects between said intersecting laser segments, said hologram being formed within said holographic medium, said medium having alternative equilibrium and disequilibrium conditions, said equilibrium condition occurring when the hologram formed within said medium corresponds to said intersecting laser beam segments in such a way that said hologram remains unchanged as long as the phase distributions of said intersecting laser beams remain unchanged, said disequilibrium condition occurring when said hologram does not correspond to said intersecting laser beam segments in such a way, said holographic means serving to couple substantially all the energy of said first laser beam segment to said second laser beam segment when said holographic medium is in equilibrium;
a detector arranged to detect the intensity distribution of said first laser beam segment as output from said holographic means;
a phase modulator for phase modulating at least one of said laser beam segments according to a modulation function, said modulator including an input for receiving a control signal for controlling the modulation function of said phase modulator; and
control means for controlling said modulation function over time so that a detection by said detector of significant laser beam intensity at a beam-cross sectional position at said detector indicates holographic disequilibrium in conjunction with a change in the modulation function at the corresponding beam cross-sectional position at said modulator and so that negligible laser beam is detected by said detector while said holographic medium is in equilibrium and said modulation function is constant.

* * * * *